Patented Mar. 23, 1926.

1,577,506

UNITED STATES PATENT OFFICE.

ERNST ALBERT EMANUEL TÖRNBLOM, OF STOCKHOLM, SWEDEN, ASSIGNOR TO CARL ADAM CARLSON, FRITZ EINAR ARTHUR HEDBORG, AND BROR SVEN OLOF DE VERDIER, ALL OF STOCKHOLM, SWEDEN.

ELECTRODE FOR ELECTRIC ARC WELDING.

No Drawing. Application filed August 14, 1923. Serial No. 657,376.

*To all whom it may concern:*

Be it known that I, ERNST ALBERT EMANUEL TÖRNBLOM, a subject of the King of Sweden, residing at Sveavagen 21, Stockholm, Sweden, have invented new and useful Improvements in Electrodes for Electric Arc Welding, of which the following is a specification.

The present invention relates to electric arc welding of metal bodies, and particularly to welding wherein a rod of metal forms one electrode of an arc, particles of metal from the rod being transferred by means of the arc to the work to be welded.

Heretofore considerable difficulty has been experienced in arc welding due to the erratic behavior of the arc, due to impurities, such as slag, in the electrode, and it is common therefore to coat the electrode with some alkaline material, such as potassium carbonate, which has a high electron emissivity when heated, and which increases the ionization of the heated metal, the effect of the alkaline material being to make the arc steady and quiet. A suitable binder, such as glue, is mixed with the alkaline material to enable it to adhere to the electrode. A difficulty experienced in connection with this coating lies in the fact that the high temperatures in the proximity of the arc cause the coating to expand and spall off, leaving the electrode bare for a short distance ahead of the arc.

I have discovered that if certain vegetable glues, preferably tragacanth gum, be used in place of the binders commonly used, the coating will not be materially affected by the heat, but will remain in place until, or approximately until, the arc reaches and consumes the entire electrode. The reason for the superior results obtained with tragacanth gum presumably lies in its low coefficient of expansion, together with the excellent adhesive properties of the material. This coating may be applied over a plate of copper applied electrolytically to the electrode, or directly to the surface of the electrode, or the coating may be applied to the work to be welded, or to both the electrode and the work.

The coating is formed by mixing potassium carbonate with sufficient tragacanth gum to cause it to adhere to the electrode, and applied by known method.

I claim:—

An electrode for electric arc welding comprising a metallic member, and a coating on said member consisting of an alkaline composition mixed with tragacanth gum.

In testimony whereof I have signed my name to this specification.

ERNST ALBERT EMANUEL TÖRNBLOM.